United States Patent [19]

Catano

[11] 4,125,862
[45] Nov. 14, 1978

[54] ASPECT RATIO AND SCAN CONVERTER SYSTEM

[75] Inventor: Paul S. Catano, San Diego, Calif.

[73] Assignee: The United States of America as represented by the Secretary of the Navy, Washington, D.C.

[21] Appl. No.: 783,134

[22] Filed: Mar. 31, 1977

[51] Int. Cl.$^2$ .............................................. H04N 5/02
[52] U.S. Cl. ................................ 358/140; 343/5 SC; 358/87; 358/212
[58] Field of Search ............... 343/5 SC; 358/87, 140, 358/212, 213, 138; 340/3 C; 364/731, 900 MS File; 360/9

[56] References Cited

U.S. PATENT DOCUMENTS

| | | | |
|---|---|---|---|
| 3,542,948 | 11/1970 | Wolff | 358/87 |
| 3,810,174 | 5/1974 | Heard et al. | 358/140 |
| 3,964,064 | 6/1976 | Brandao et al. | 343/5 SC |
| 4,002,827 | 1/1977 | Neuin et al. | 358/140 |
| 4,013,832 | 3/1977 | Douglas | 358/212 |
| 4,025,950 | 5/1977 | Matsumoto et al. | 358/138 |
| 4,058,835 | 11/1977 | Kennedy | 358/138 |

Primary Examiner—Robert L. Griffin
Assistant Examiner—Joseph A. Orsino, Jr.
Attorney, Agent, or Firm—R. S. Sciascia; G. J. Rubens; J. W. McLaren

[57] ABSTRACT

An aspect ratio and scan converter system adapts signal information derived from optical scanning of a rectangular field of view having an aspect ratio of the order of 60 to 1. The signal information is converted to digital form and serially stored in a bulk storage memory which may be addressed for reading out selected sequences of the serially stored digital signals. The selected sequences are stored in a random access memory having a two dimensional format and then read out by repetitive scan in a direction orthogonally related to the direction in which the sequences were stored. The digital signals thus read out are converted to analog form and applied to a suitable display means such as a TV type monitor CRT, providing a visual display of the selected portion of the elongate field of view.

9 Claims, 4 Drawing Figures

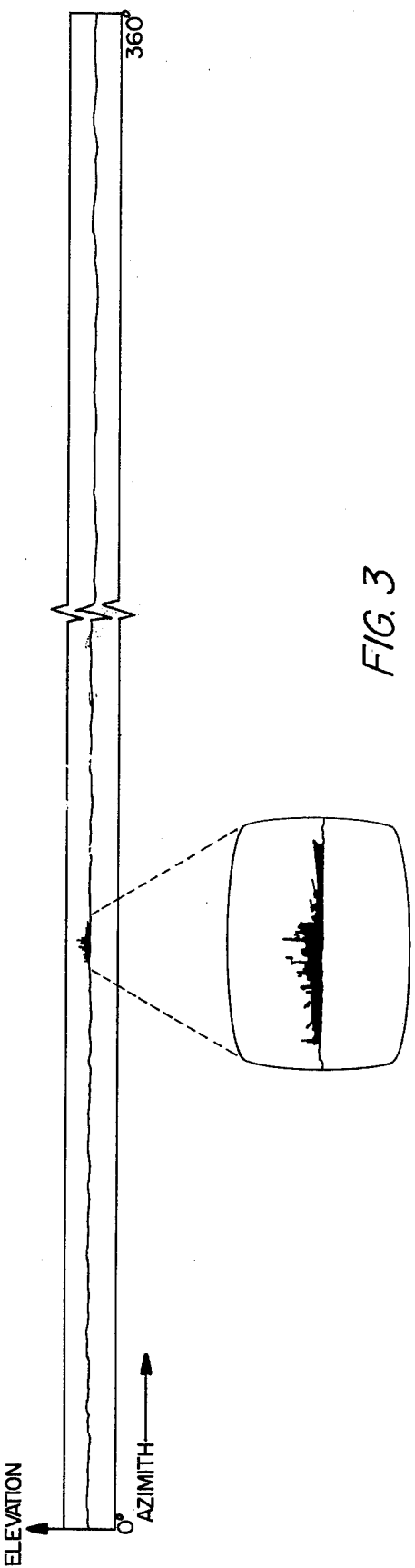

ASPECT RATIO AND SCAN CONVERTER SYSTEM

BACKGROUND OF THE INVENTION

In prior art practices most real time imaging sensors employed to develop signal information representing an optical field of view in the visible, infrared, or other portions of the electromagnetic spectrum, have been limited to a detection field of view typically having an aspect ratio of 4 by 3 or 1 by 1 in order to provide a signal output compatible with visual display on a television format type of monitor output customarily having an aspect ratio of 4 by 3.

However, with the advent of much improved imaging sensors, particularly of the infrared and charge coupled device types, new applications have been made possible involving non-repetitive scan of detection fields containing signal information producing a field of view having extraordinary aspect ratios which are not readily adaptable to visual display on the customarily employed monitor having a television type format with a conventional aspect ratio, such as 4 to 3, for example.

For example, one such recent new application employs a photoresponsive linear array employing a high speed scan in the vertical direction covering approximately 6° of elevation in a field of view. The photoresponsive linear array is driven rotatably through 360° of azimuth in a single ten second panoramic search mode of operation. The signal information thus developed in this non-repetitive scan provides a resultant field of view having an effective aspect ratio of 60 to 1, i.e., 360° in azimuth, vs 6° in elevation. Such a mode of rotational scan through 360° finds many highly useful applications as in the scanning of a horizon, for example, but it presents much difficulty in adapting the resultant 60 to 1 aspect ratio of the field of view to a suitable visual display because the extraordinary high aspect ratio differs so radically from the conventional TV type monitor format having a conventional 4 to 3 aspect ratio.

Accordingly, a new means and system for converting such a high aspect ratio and also adapting the scan of such a system is required to produce the end result of a suitable visual display on a TV monitor type format having a conventional 4 to 3 aspect ratio, for example.

SUMMARY OF THE INVENTION

As conceived by the present invention, signal information is developed by a photoresponsive sensor which optically scans a substantially rectangular field of view; such optical scanning is achieved at a high scan speed along the minor axis of the field of view relative to a low scan speed along the major axis of the field of view which results in an unusually high aspect ratio that may be of the order of 60 to 1, for example. For purposes of this disclosure and teaching the term "aspect ratio" is understood to mean the ratio of frame width to frame height of a field of view such as, for example, that visually displayed on a conventional television screen for which the standard aspect ratio is 4 to 3.

Moreover, the conventional television type of cathode ray tube visual presentation conventionally employs a high speed horizontal scan of 525 lines per frame and a low speed vertical scan of 30 frames per second. Thus, a secondary, but equally important problem is posed by the requirement of converting signal information derived from the high speed vertical scan and relatively low speed horizontal scan to presentation on the face of a conventional television type monitor cathode ray tube which operates with a relatively high horizontal scan rate and a relatively low vertical scan mate which is the converse of the relative scan rates at which the signal information was originally derived from the scanned field of view.

Such unusual aspect ratios occur where, for example, a photosensitive sensor is employed in the form of a high speed linear array which is disposed vertically and caused to be rotated through as much as 360° to scan the horizon at sea, for example. This mode of operation produces a high scan speed along the minor axis, i.e., the vertical scan of the field of view, and a relatively low scan speed in the rotational scan which is the major axis of the field of view.

Similarly, a high speed photosensitive linear array may be disposed to look downwardly in an aircraft so that the high speed scan is accomplished laterally with a relatively low speed scan being accomplished through the actual movement of the aircraft as it flies over the field of view which it is desired to detect optically. In either case it will be evident to those skilled and knowledgeable in the pertinent arts that such applications develop signal information which employs optical scanning at a high scan speed along a minor axis of a rectangular field of view, but a relatively low scan speed along the major axis of the field of view.

The concept of the present invention contemplates the use of digital techniques in handling the signal information. Thus, the analog signal information developed from the optical scanning as described is initially processed in an analog-to-digital converter to develop commensurate digital signals. The digital signals thus generated, which are representative of the scanned substantially rectangular field of view, are stored serially in a bulk storage memory which may be of the disc or drum type, for example, so that each sequence of vertical scan is stored serially in the same order as it was chronologically developed by the high speed optical scanning along the minor axis of the rectangular field of view.

Typically a bulk storage memory such as a magnetically recording disc or drum has the advantage of being significantly less expensive than other functionally comparable types of storage memories. However, the bulk storage memory of the magnetic disc or drum type has the advantage of storing the signal information serially and can only be addressed serially for reading out the signal information.

The concept of the present invention contemplates exploiting the low cost, large storage capabilities of a disc or drum bulk storage memory and overcoming its disadvantage by providing means for addressing the bulk storage for reading out selected sequences of the digital signals serially stored therein, representing a selected portion of the extended field of view originally scanned. Means for addressing the bulk storage memory is customarily included as a part of the bulk storage memory equipment and for use in the present invention is preferably manually operated in a selective manner such as by the setting of a dial having appropriate indicia, in accordance with the particular application of the invention.

The selected sequences of digital signals which are read out of the bulk storage memory and represent a selected portion of the field of view are received and stored in at least one random access memory characterized by the capability of storing such selected sequences of digital signals in a two dimensional format. Thus, for example, the random access memory having storage capabilities of a two dimensional format may receive and store each of the selected sequences representing an individual high speed vertical scan of the rectangular field of view along a first direction designated as vertical storage in the two dimensional format of the random access memory.

Means for addressing the random access memory, which may be incorporated as a part of the memory equipment, is employed to read out the stored selected sequences of digital signals by repetitive scan in the second direction of its two dimensional format. Thus, as may be readily appreciated by those skilled and knowledgeable in the pertinent arts, such repetitive scan in the second direction of the two dimensional storage format performs the function of scan conversion to adapt the stored digital signal information to the conventional television monitor scan format.

A digital-to-analog converter receives the digital output of the random access memory and develops commensurate analog signals which are applied to an appropriate visual display means such as a television monitor cathode ray tube which is responsive to the analog signals for producing a conventional raster format of the visual information contained in the selected portion of the field of view.

Accordingly, the present invention both adapts an extraordinarily high aspect ratio of a field of view and converts the mode of scanning for providing a visual presentation on a conventional cathode ray tube display.

A primary object of the present invention is therefore to provide an aspect ratio and scan converter system for use with signal information developed from optical scanning of a rectangular field of view at a high scan speed along its minor axis relative to a low scan speed along its major axis.

Another important object of the present invention is to employ the advantages of digital signal handling and storing techniques in accomplishing its adaptation and converter functions.

Yet another object of the present invention is to avail of the relatively inexpensive and high speed storing capabilities of bulk storage memories such as magnetic discs and drums.

A further object of the present invention is to adapt the limitation of such bulk storage memory devices, which only read out serially, to provide selected portions of stored signal information representative of a selected portion of the field of view as desired.

A further objective of the present invention is to provide an aspect ratio and scan converter system which avails of the advantageous operative characteristics of high speed linear photosensitive arrays such as charge coupled devices.

Another object of the present invention is to provide such an aspect ratio and scan converter system which is readily adapted to provide a visual display in an automatic search mode of operation as, for instance, scanning a horizon through 360° rotation.

These and other features, objects, and advantages of the present invention will be better appreciated from an understanding of the operative principles of a preferred embodiment as described hereinafter and as illustrated in the accompanying drawings.

BRIEF DESCRIPTION OF THE DRAWINGS

In the drawings:

FIG. 3 is a representation of the type of field of view which may be represented by the signal information developed from the panoramic 360° scan of the high speed photosensitive linear array as shown in FIG. 2.

DESCRIPTION OF THE PREFERRED EMBODIMENTS

Figure 1:
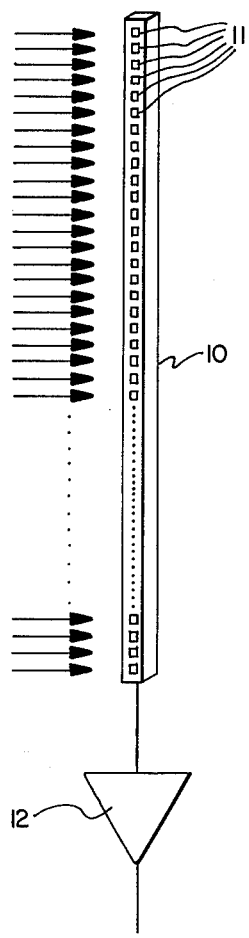
FIG. 1 is a schematic representation of a high speed photosensitive linear array such as may be employed in an embodiment of the present invention.

FIG. 1 is a schematic representation of the type of high speed photosensitive linear array which may be employed in the implementation of the concept of the present invention. Such arrays may take the form of self-scanning photo diode integrated circuits or charge coupled devices. One such high speed self-scanning photo diode linear array, for example, is commercially available in a circuit card form containing all the required peripheral drive and amplifier circuits as well as the photosensitive elements and may provide as many as 1,024 linearly arrayed photosensitive elements in the form of photo diodes which are internally scanned to provide serial output signal information on a signal video line.

In FIG. 1 the photosensitive linear array comprises a plurality of separate, contiguous elements 11 which in a typical array presently commercially available, may number from 16 to 1,024 to satisfy specific requirements. One embodiment of the present invention employed a high-speed, self-scanning linear photo diode array comprised of 384 closely spaced contiguous discrete photoresponsive elements. Such elements may be responsive to infrared, visible radiation, or other discrete portions of the electromagnetic spectrum. A single silicon chip may contain the row of photodiodes, each with an associated capacitance, a MOS multiplex switch, and MOS shift register for scanning, as well as internal drive and/or amplification circuits. The shift register is driven by two-phase or four-phase clock voltages and each scan is initiated by a start pulse. The start pulse loads a bit which is clocked through the register successively, opening and closing the switches, thus connecting each photodiode in turn to the video output line.

As each photodiode is accessed, its capacitance is charged to the video line potential and left open circuited until the next scan. During this period the capacitor will be discharged by an amount equal to the instantaneous photo current in the diode integrated over the line scan time. Each time a diode is sampled, this integrated charge must be replaced through the video line. Accordingly, the resulting video signal is a train of charge pulses, each having a magnitude proportional to the light intensity on the corresponding photodiode.

Thus, it is illustrated in FIG. 1, the discrete photosensitive elements 11 may be scanned at a desired repetitive rate determined by the applied clock pulses to provide a serial video output through the output amplifier 12. The serial analog signal information thus generated is representative of a vertical line scan when the high speed photoresponsive linear array is in a vertical position.

In order to provide a two dimensional field of view, the high speed photoresponsive linear array as shown in FIG. 1 must be moved in a horizontal plane to provide the desired field of view. In one application of the present invention, the high speed photoresponsive linear array of FIG. 1 is rotated through 360° to provide a panoramic search scan, such as may be desired when a submarine periscope is extended above the surface, scanned through a full 360°, and then retracted.

Figure 2:
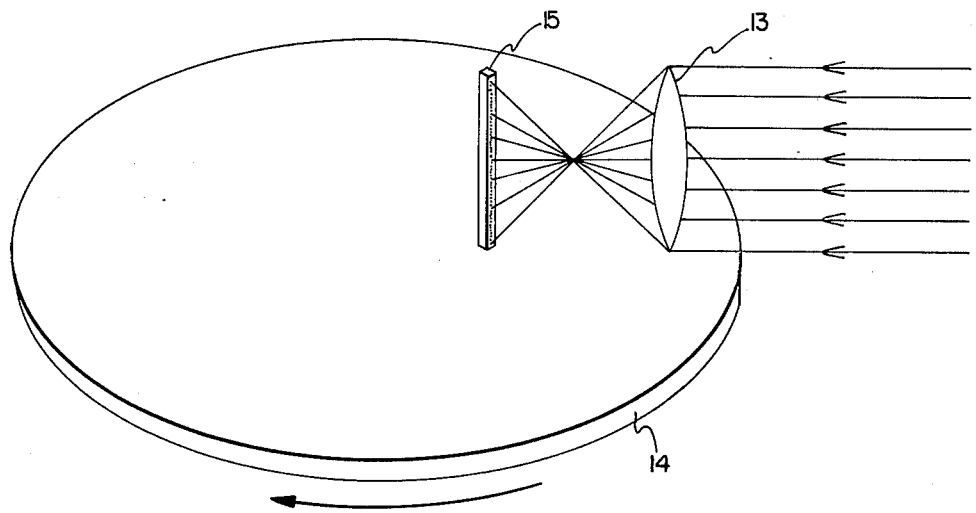
FIG. 2 is a schematic representation of the high speed photosensitive linear array of FIG. 1 mounted to be rotatably driven through a 360° panoramic scan.

FIG. 2 schematically illustrates the manner in which such panoramic 360° scanning may be accomplished. A suitable lens 13 is mounted on a rotatably driven disc 14 to focus radiation from an approximate 6° vertical field of view, for example, upon the high speed photosensitive linear array 15 which is also supported on the rotatably driven disc 14. Thus, rotation of the assembly shown in FIG. 2 through a full 360°, and scanning 6° in elevation centered approximately at the horizon, will produce signal information representative of a composite field of view which has an effective aspect ratio of 360° versus 6°, or 60 to 1.

Though not to scale, FIG. 3 is a partial representation of a panoramic field of view presented by such operation which may have an aspect ratio of approximately 60 to 1. As may be readily appreciated from the illustration of FIG. 3, such signal information as initially derived is not readily adapted to presentation on a conventional television monitor, because the conventional television type monitor has a format which not only utilizes an aspect ratio of 4 to 3, but also employs a high speed horizontal scan and relatively low speed vertical scan as contrasted to the high speed vertical scan and relatively low speed horizontal scan which develop the panoramic view of FIG. 3.

Figure 4:
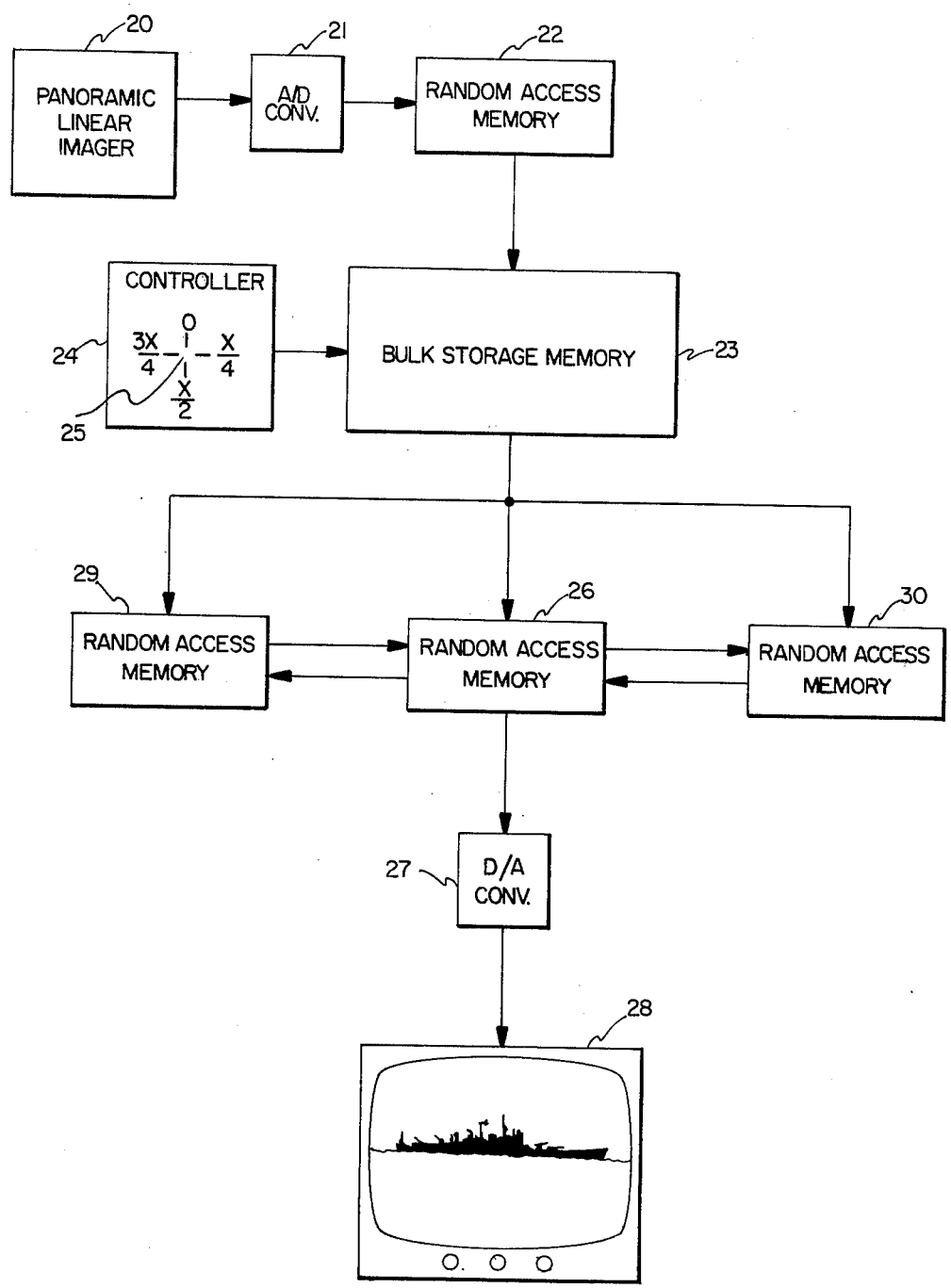
FIG. 4 is a schematic block diagram illustrating a preferred embodiment of the present invention.

FIG. 4 is a schematic representation of a typical preferred embodiment of the present invention. Signal information as developed by optical scanning at a high scan speed along the minor axis of the rectangular field of view and relative low scan speed along the major axis of the field of view, may be developed by a panoramic linear imager 20 rotatably driven as previously described.

The signal information thus derived is analog in nature and is fed as an input to an analog-to-digital converter 21 where commensurate digital signals are developed. Such digital signals may in turn provide the input to a high-speed, random access memory 22 in certain preferred embodiments of the present invention, though such interconnection with the high speed random access memory 22 is not an absolute essential to the basic concept of the present invention.

The digital signal information is, in turn, fed to a bulk storage memory 23, such as a magnetic disc or magnetic drum. The bulk storage memory 23 has the advantage of being relatively, inexpensive, offering high speed operation, and having a large storage capacity, though it suffers from the disadvantage of being capable of only serial storage and may only be addressed serially as contrasted to other types of memory which have random access.

A controller 24 provides a means for addressing the bulk storage memory 23 for reading out selected sequences of digital signals serially stored therein which represent a selected portion of the full field of view represented by the entire serially stored original signal information input. Thus, the controller 24 addresses the bulk storage memory 23, usually in response to the manual setting of a dial 25 which may be set at any desired portion of the 360° panoramic field of view.

The controller 24 directs the bulk storage memory 23 to the desired point in the field of view through serial access and that portion of the field of view is read out into a high speed random access memory 26. The high speed random access memory 26 receives and stores each of the selected sequences of digital signal in a first direction of a two dimensional format. Each vertical scan, for instance, representing one sequence of a number of selected sequences which cumulatively comprise a selected portion of the field of view, may be stored in a first direction of the two dimensional format capability of the random access memory.

As is customarily the case, such random access memory also includes means for addressing it and in accordance with the concept of the present invention, the random access memory 26 is addressed to read out the stored selected sequences of digital signals by repetive scan in the second direction of its two dimensional storage format. This, in effect, changes the vertical scan as originally developed in the initial signal information to a horizontal scan of the same signal information.

A digital-to-analog converter 27 transposes the output of the high speed random access memory 26 from digital to analog form and such analog signal information is impressed as the input on a display means. A display means may take the form of a conventional television monitor 28 as shown in FIG. 4.

Accordingly, the embodiment of the present invention as shown in the schematic block diagram of FIG. 4 adapts the originally developed signal information in two important respects; firstly, it provides the selection of desired portions of the field of view from the bulk storage memory which stores the entire 360° panoramic signal information and, secondly, it adapts a high speed vertical scan and relatively slow speed horizontal scan to the conventional high speed horizontal scan and slower vertical scan of a conventional television monitor raster format. Thus, both the scan and the aspect ratio of the originally developed signal information has been adapted to convenient and highly desirable visual presentation.

In a preferred embodiment of the present invention there may be included additional high speed access memories 29 and 30 as shown in FIG. 4 which are interconnected with the high speed random access memory 26 and the bulk storage memory 23 to be responsive to the controller means 24 for addressing the bulk storage memory 23, to read out additional selected sequences of digital signals representing second and third selected portions of the full 360° panoramic field of view. The additional second and third selected portions of the field of view are contiguous to the originally selected portion stored in the high speed random access memory 26 and are received and stored in random access memories 29 and 30.

In this manner the controller 24 can rapidly change the selected portion of the full field of view by manual manipulation of the dial 25. In operation the controller 24 effectively causes the bulk storage memory 23 to read out additional signal information to high speed random access memory 29, for example, which is, in turn, fed to random access memory 26 and, in turn, causes excess digital signal information to be dumped out of high speed random access memory 30 as necessary. This, for example, would have the effect of changing the selected portion of the field of view from left to right.

Conversely, in response to manual setting of the controller 24 the bulk storage memory 23 may be caused to feed additional selected signal information to the high speed random access memory 30 which, in turn, is fed to the central high speed random access memory 26 causing excess digital signal information to be dumped from the high speed random access memory 29. This, in effect, would cause the selected field of view visually presented on the television monitor display 28 to be moved from left to right.

Additionally, in a preferred embodiment of the present invention the controller 24 may be provided with an automatic search scan mode to cause the operation of the interconnected random access memories 26, 29 and 30 to be constantly and gradually changed so as to present a visual display on the television monitor 28 which comprises a search mode gradually presenting the entire field of view from 0° through full rotation of 360°, in effect recreating the original optical scan of a submarine periscope with the added most desirable advantage of being adapted to stop the scans at any desired point for scrutiny, or alternatively return to any point for additional scruting without exposure of a periscope above the surface. Such operation may be readily achieved by the automation of the readout function of controller 24 in lieu of its manual mode of operation which is responsive to the setting of the dial 25.

To more fully explain the actual operation of a typical embodiment of the present invention employing a high speed photo diode linear array, it may be assumed that the initial signal information is developed by the optical scanning provided by a commercially available RETICON Model RL 384EC self-scanning photodiode array in a circuit card form including all the required peripheral drive and amplifier circuits. This commmercially available unitized array provides a data rate of 10MHz. Typically, such an array may have multiple elements, each of which represents a vertical aperture of one quarter milliradian. This particular model of photodiode array comprises three hundred and eighty-four linearly aligned photoresponsive elements; the total vertical aperture would therefore comprise ninety-six milliradians or approximately 5.5° in elevation.

Assuming that the self-scanning photodiode array is rotatably driven through a horizontal plane of 360°, and the horizontal aperture of each photoresponsive element is one quarter milliradian, the entire 360° panoramic field of view will consist of 6,283.2 milliradians or 25,133 lines.

Further, since the total number of photoresponsive elements in one panoramic 360° rotational sweep consists of the number of lines multiplied by 384 photoresponsive elements per line, $9.65 \times 10^6$ discrete photoresponsive elements would be actuated in a total panoramic 360° rotational sweep.

If it were further assumed that there are six bits of digital information required to represent each photoresponsive element digitally, the memory size for the bulk storage memory required would be $57.9 \times 10^6$ bits. As previously stated, the maximum data rate of the RETICON RL384EC self-scanning photodiode array is 10MHz; therefore, the panoramic search of 360° could be performed in 1 second each rotation. However, in actual operation the rotational scan rate need not be that fast and typically a rotational scan rate of one complete scan each 10 seconds would be acceptable. This would require a data rate of 10.965MHz so that if the self-scanning photodiode linear array employed for purposes of explanation of the operative example were to be clocked at a 1MHz rate, an entirely satisfactory 10 second cyclic panoramic sweep rate would be achieved requiring rotation of the optical scanner at a rate of 36° per second.

From the above typical operative example of one embodiment of the present invention it is evident that the present state of the art provides the required elements having the necessary operative characteristics to easily realize the desired results. Though the example of a self-scanning photodiode linear array has been given, those skilled and knowledgeable in the electro-optics and related arts involved in the concept of the present invention will readily appreciate that other types of photoresponsive devices may be readily employed within the basic concept of the present invention. One such type of device is a charged coupled device which makes it possible to avail of additional advantages such as higher resolution, higher speed of operation, more reliable performance, etc.

From the description of a rotating panoramic field of view embodiment of the present invention in the foregoing example it will be evident that the basic concept of the present invention in adapting a field of view having an extraordinarily high aspect ratio and two dimensional scan rates is highly advantageous in other applications. For example, a high speed linear photoresponsive scanning device may be supported looking downwardly from an aircraft to provide high speed repetitive scanning in a direction normal to the direction of flight of the aircraft, in which case the speed of the aircraft over the surface provides the other degree of scanning to complete a full field of view. It will be readily apparent that signal information thus developed can be processed in accordance with the basic concept of the present invention as explained hereinbefore to provide the visual display of a selected portion of an elongate field of view having an extraordinarily high aspect ratio and different scan rates in two dimensions with respect to the scan rates of the conventional television monitor type.

Obviously many modifications and variations of the present invention are possible in the light of the above teachings. It is therefore to be understood that within the scope of the appended claims the invention may be practiced otherwise than as specifically described.

What is claimed is:

1. An aspect ratio and scan converter system for use with signal information developed from optical scanning of a rectangular field of view at a high scan speed along the minor axis relative to low scan speed along the major axis of the field of view comprising:
   an analog-to-digital converter connected to receive said signal information for developing commensurate digital signals;
   a bulk storage memory for serially storing the sequences of digital signals developed from high speed optical scanning along said minor axis and representing said entire rectangular field of view;
   means for addressing said bulk storage memory for reading out selected sequences of digital signals serially stored therein representing a selected portion of said field of view;

a random access memory for receiving and storing each of said selected sequences of digital signals in a first direction of a two-dimensional format;

means for addressing said random access memory to read out the stored selected sequences of digital signals by repetitive scan in the second direction of said two-dimensional format;

a digital-to-analog converter for receiving the digital output of said random access memory and developing commensurate analog signals; and display means responsive to said analog signals for producing a raster format of the visual information contained in said selected portion of said field of view.

2. An aspect ratio and scan converter system as claimed in claim 1 and including a photoresponsive linear array scanned in a plane normal to the principal axis of said array for developing the signal information representative of said rectangular field of view.

3. An aspect ratio and scan converter system as claimed in claim 2 wherein said photoresponsive linear array is driven through an arcuate scan in a plane normal to the principal axis of said array.

4. An aspect ratio and scan converter system as claimed in claim 2 wherein said photoresponsive linear array comprises solid state self-scanning photodiodes.

5. An aspect ratio and scan converter system as claimed in claim 2 wherein said photoresponsive linear array comprises a charge coupled device.

6. An aspect ratio and scan converter system as claimed in claim 2 wherein said photoresponsive linear array detects infrared radiation.

7. An aspect ratio and scan converter system as claimed in claim 1 wherein said display means comprises a cathode ray tube.

8. An aspect ratio and scan converter system as claimed in claim 7 and including second and third random access memories interconnected with said random access memory and said bulk storage memory, and responsive to said means for addressing said bulk storage memory for receiving and storing selected sequences of digital signals representing second and third selected portions of said field of view contiguous to the selected portion of said field of view stored in said random access memory.

9. An aspect ratio and scan converter system as claimed in claim 1 wherein said means for addressing said bulk storage memory is adapted for automatically reading out digital signals stored therein in serial order from beginning to end to provide sequential scanning through the entire major axis of said field of view in a search mode of operation.

* * * * *